(12) United States Patent
Tsujiyama

(10) Patent No.: US 7,857,526 B2
(45) Date of Patent: Dec. 28, 2010

(54) ELECTROMAGNETIC ACTUATOR

(75) Inventor: Junki Tsujiyama, Saitama (JP)

(73) Assignee: Hoya Corporation, Tokyo (JP)

( * ) Notice: Subject to any disclaimer, the term of this patent is extended or adjusted under 35 U.S.C. 154(b) by 184 days.

(21) Appl. No.: 12/254,975

(22) Filed: Oct. 21, 2008

(65) Prior Publication Data
US 2009/0110388 A1    Apr. 30, 2009

(30) Foreign Application Priority Data
Oct. 24, 2007    (JP) ............................. 2007-275986

(51) Int. Cl.
*G03B 19/12*    (2006.01)
(52) U.S. Cl. .................. 396/358; 396/463; 310/15; 310/36; 335/272
(58) Field of Classification Search ................ 396/358, 396/463, 502; 310/15, 17, 21, 36; 335/229–234, 335/272
See application file for complete search history.

(56) References Cited

U.S. PATENT DOCUMENTS

| 4,660,010 A * | 4/1987 | Burton ........................ 335/228 |
| 6,370,339 B1 * | 4/2002 | Stern et al. .................. 396/429 |
| 2004/0106898 A1 | 6/2004 | Masunishi |

FOREIGN PATENT DOCUMENTS

| JP | 6-258689 | 9/1994 |
| JP | 7-13218 | 1/1995 |
| JP | 2565656 | 10/1996 |
| JP | 10-333208 | 12/1998 |
| JP | 2898240 | 3/1999 |
| JP | 2006-48768 | 2/2006 |
| JP | 2006-324281 | 11/2006 |

* cited by examiner

*Primary Examiner*—Christopher E Mahoney
*Assistant Examiner*—Autumn Parker
(74) *Attorney, Agent, or Firm*—Greenblum & Bernstein P.L.C.

(57) ABSTRACT

An electromagnetic actuator is provided, including a bobbin made of a non-magnetic material including a hollow cylindrical portion and disk flanges; a coil formed between the disk flanges; a power supply which supplies a current to the coil; a movable member pivoted on the hollow cylindrical portion; and a stationary member made of a permanent magnet and fixed to a disk flange. The movable member is a magnetic material and includes a shaft portion and a rotating portion. The rotating portion is fixed to the shaft portion, lies on the disk flange, and extends in a radial direction of the shaft portion. When the power supply supplies the current to the coil in a predetermined direction, the rotating portion is magnetized to a predetermined polarity and rotates. The stationary member includes a stopper for stopping rotation of the movable member at a predetermined rotational position.

12 Claims, 8 Drawing Sheets

ELECTROMAGNETIC ACTUATOR

BACKGROUND OF THE INVENTION

1. Field of the Invention

The present invention relates to an electromagnetic actuator including an electromagnet and a permanent magnet, and more specifically relates to such a type of electromagnetic actuator in which a movable member is reciprocatively rotatable.

2. Description of the Related Art

In apparatuses such as cameras which are provided therein with various movable mechanisms, it is often the case that one or more electromagnetic actuators are used as driving sources for the movable mechanisms.

An electromagnetic actuator consisting of an output shaft, a plurality of permanent magnets and a rotary plate stopper has been proposed as a type of electromagnetic actuator in which a movable member is rotated, reciprocatively, in Japanese patent publication No. 2565656 (hereinafter referred to as Patent Document 1), wherein the output shaft is inserted into a hollow portion of a coil and has a rotary plate at one end of the output shaft, the plurality of permanent magnets are arranged at appropriate intervals around the perimeter of the rotary plate, and a rotary plate stopper is installed at a position deviating from the magnetic neutral point of the permanent magnets in a rotational direction of the rotary plate to limit the range of rotation of the rotary plate.

The electromagnetic actuator disclosed in Patent Document 1 is provided with the aforementioned plurality of permanent magnets, which are adopted to give a rotational force to the aforementioned rotary plate mounted to the output shaft of the electromagnetic actuator and the aforementioned rotary plate stopper for limiting the range of rotation of the rotary plate. Therefore, the plurality of permanent magnets and the rotary plate stopper need to be installed around the rotary plate, and also the number of elements of the electromagnetic actuator is large, which becomes an obstacle to miniaturization and weight reduction of the electromagnetic actuator. In addition, since the plurality of permanent magnets need to be arranged and supported so that the N-poles and the S-poles are positioned at 180 degree positions with respect to the rotary plate, and since the rotary plate stopper needs to be provided at a position which deviates from the magnetic neutral point of the permanent magnets in a rotational direction of the rotary plate to hold the rotation position of the output shaft by the rotary plate stopper, the installation positions of the permanent magnets and the shape of the rotary plate stopper need to be designed in an appropriate manner when the range of rotation of the rotary plate, namely, the range of rotation of the output shaft is determined. Consequently, the design for determining the range of rotation of the output shaft becomes complicated, and it becomes difficult to set a desired rotational range for the output shaft. Therefore, to apply the electromagnetic actuator disclosed in Patent Publication 1 to a small apparatus such as a camera, it is desired to achieve a reduction in the number of elements of the electromagnetic actuator and improvements in miniaturization and weight reduction of the electromagnetic actuator.

SUMMARY OF THE INVENTION

The present invention provides an electromagnetic actuator in which miniaturization and weight reduction are achieved by a reduction in the number of elements to make the electromagnetic actuator applicable to a small apparatus such as a camera. The present invention further provides an electromagnetic actuator in which the range of rotation of the output shaft can be freely determined and which can be easily produced.

According to an aspect of the present invention, an electromagnetic actuator is provided, including a bobbin made of a non-magnetic material which includes a hollow cylindrical portion and two disk flanges fixed to opposite ends of the hollow cylindrical portion, respectively; a coil formed between the two disk flanges by winding insulated wire around the hollow cylindrical portion; a power supply which supplies a current to the coil; a movable member pivoted on the hollow cylindrical portion; and at least one stationary member made of a permanent magnet and fixed to at least one of the two disk flanges. The movable member is made of a magnetic material and includes a shaft portion and at least one rotating portion. The shaft portion is pivoted about the hollow cylindrical portion. The rotating portion is fixed to the shaft portion, lies on the disk flange, and extends in a radial direction of the shaft portion. When the power supply supplies the current to the coil in a predetermined direction, the rotating portion is magnetized to a predetermined polarity and rotates on the disk flange by a magnetic force of the permanent magnet. The stationary member includes a stopper for stopping rotation of the movable member at a predetermined rotational position.

The electromagnetic actuator according to the present invention can limit the range of rotation of the movable member and hold the rotation position of the movable member by making the rotating portion of the movable member come into contact directly with the stopper of the stationary member that is made of a permanent magnet while magnetically attracting and holding the rotating portion of the movable member by the magnetic force of the permanent magnet. Therefore, as compared with an electromagnetic actuator such as disclosed in Patent Publication 1 that includes a plurality of permanent magnets and a rotary plate stopper which are provided independently of each other, a further reduction in the number of elements, further miniaturization and a further weight reduction become possible in the electromagnetic actuator according to the present invention. Additionally, since the angular position of rotation and the range of rotation of the movable member can be determined simply by designing the stationary member, the range of rotation of the movable member can be easily determined; moreover, the electromagnetic actuator can be easily produced.

It is desirable for the rotating portion of the movable member to be formed into a sector-shaped core centered about an axis of the shaft portion, wherein the stationary member is provided so as to lie in a plane in which the sector-shaped core of the movable member rotates, and wherein radial-edge faces of the stationary member are magnetized as one and the other of an S-pole and an N-pole.

The sector-shaped core that is provided at one end of the shaft portion is magnetized into one of an S-pole and an N-pole while the other end of the shaft portion or the sector-shaped core joined to this other end of the shaft portion is magnetized into the other polarity, so that a repulsive force and an attractive force in a circumferential direction are produced relative to the permanent magnet, which causes the sector-shaped core to rotate reciprocatively about the shaft portion. This makes it possible for the stationary member to be made of a single permanent magnet, thus making miniaturization and weight reduction of the electromagnetic actuator possible.

Specifically, it is desirable for two of the rotating portions to be joined to both ends of the shaft portion, respectively, and to be magnetized as opposite polarities, respectively, when the power supply supplies the current to the coil, wherein two of stationary members are positioned to correspond to the two sector-shaped portions, and radial-edge faces of each of the two stationary members are magnetized as one and the other of an S-pole and an N-pole. A repulsive force and an attractive force that are reciprocal with each other at each end of the shaft portion are produced to thereby obtain high torque. In addition, even in this configuration, the stationary member can be made of two permanent magnets in total, thus making miniaturization and weight reduction of the electromagnetic actuator possible.

It is desirable for the following equation to be satisfied:

$$\theta a + \theta b + \theta r = 2\pi;$$

wherein θa designates a central angle of the sector-shaped core, θb designates a central angle of the stationary member, and θr designates a maximum angle of rotation of the sector-shaped core.

It is desirable for the electromagnetic actuator to be used as a drive source of a mirror drive device for rotating a main mirror of an SLR camera reciprocatively.

It is desirable for the electromagnetic actuator to be used as a drive source of a mirror drive device for rotating a main mirror of an SLR camera reciprocatively.

It is desirable for the rotating portion to be provided on each lateral end of the main mirror at a rotational axis thereof, for each of the rotating portion to be formed into a sector-shaped core centered about an axis of the shaft portion, coaxial with the rotational axis of the main mirror, for the stationary member to be provided at each of the sector-shaped core so as to lie in a plane in which the sector-shaped core of the movable member rotates, and for radial-edge faces of the stationary member to be magnetized as one and the other of an S-pole and an N-pole. Upon the mirror being driven in an up/down direction, one of two radial edge faces of each of the sector-shaped core abut against one of the radial-edge faces of each corresponding the stationary member.

It is desirable for the electromagnetic actuator to be used as a drive source of a shutter device for making shutter blades perform an opening/shutting operation.

Hence, it is possible to provide a small and light-weight camera can be made, and in addition, provide a high-speed mirror up/down operation and a high-speed shutter opening/shutting operation.

It is desirable for the stationary member to be formed as a semi-circular plate.

It is desirable for the semi-circular plate to be substantially identical in radius to the one of the two disk flanges.

In an embodiment, an electromagnetic actuator is provided, including a bobbin made of a non-magnetic material which includes a hollow cylindrical portion and two disk flanges fixed to opposite ends of the hollow cylindrical portion, respectively; a coil wound around the hollow cylindrical portion; a rotatable member which is supported by the bobbin to be freely rotatable about an axis of the hollow cylindrical portion; and a permanent magnet fixed to one of the two disk flanges. The rotatable member is made of a soft magnetic material and includes a shaft portion and a swingable portion, the shaft portion is fitted into the hollow cylindrical portion to be freely rotatable about the axis. The swingable portion lies on the one disk flange and extends in a radial direction of the shaft portion. When current is supplied to the coil in a predetermined direction, the swingable portion is magnetized as a predetermined polarity and rotates on the disk flange by a magnetic force of the permanent magnet. At least one of radial-edge faces of the permanent magnet serves as a stopper for stopping rotation of the rotatable member at a predetermined rotation position, the radial-edge faces constituting one and the other of an N-Pole and an S-Pole.

In an embodiment, an SLR camera is provided, to which a photographing lens is detachably attached, including a quick-return mirror provided in a camera body of the camera; at least one electromagnetic actuator provided on the quick-return mirror and configured to reciprocatively rotate the quick-return mirror between an upward position and a downward position.

It is desirable for the electromagnetic actuator to include a bobbin made of a non-magnetic material which includes a hollow cylindrical portion and two disk flanges fixed to opposite ends of the hollow cylindrical portion, respectively; a coil formed between the two disk flanges by winding insulated wire around the hollow cylindrical portion; a power supply which supplies a current to the coil; a movable member pivoted on the hollow cylindrical portion; and at least one stationary member made of a permanent magnet and fixed to at least one of the two disk flanges. The movable member is made of a magnetic material and includes a shaft portion which is connected with the quick return mirror so as to integrally rotate with the quick-return mirror, and at least one rotating portion. The shaft portion is pivoted about the hollow cylindrical portion. The rotating portion is fixed to the shaft portion, lies on the disk flange, and extends in a radial direction of the shaft portion. When the power supply supplies the current to the coil in a predetermined direction, the rotating portion is magnetized to a predetermined polarity and rotates on the disk flange by a magnetic force of the permanent magnet, to thereby rotate the quick-return mirror via the shaft portion. The stationary member includes a stopper for stopping rotation of the movable member at a predetermined rotational position.

The present disclosure relates to subject matter contained in Japanese Patent Application No. 2007-275986 (filed on Oct. 24, 2007) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Embodiment 1

Figure 1:
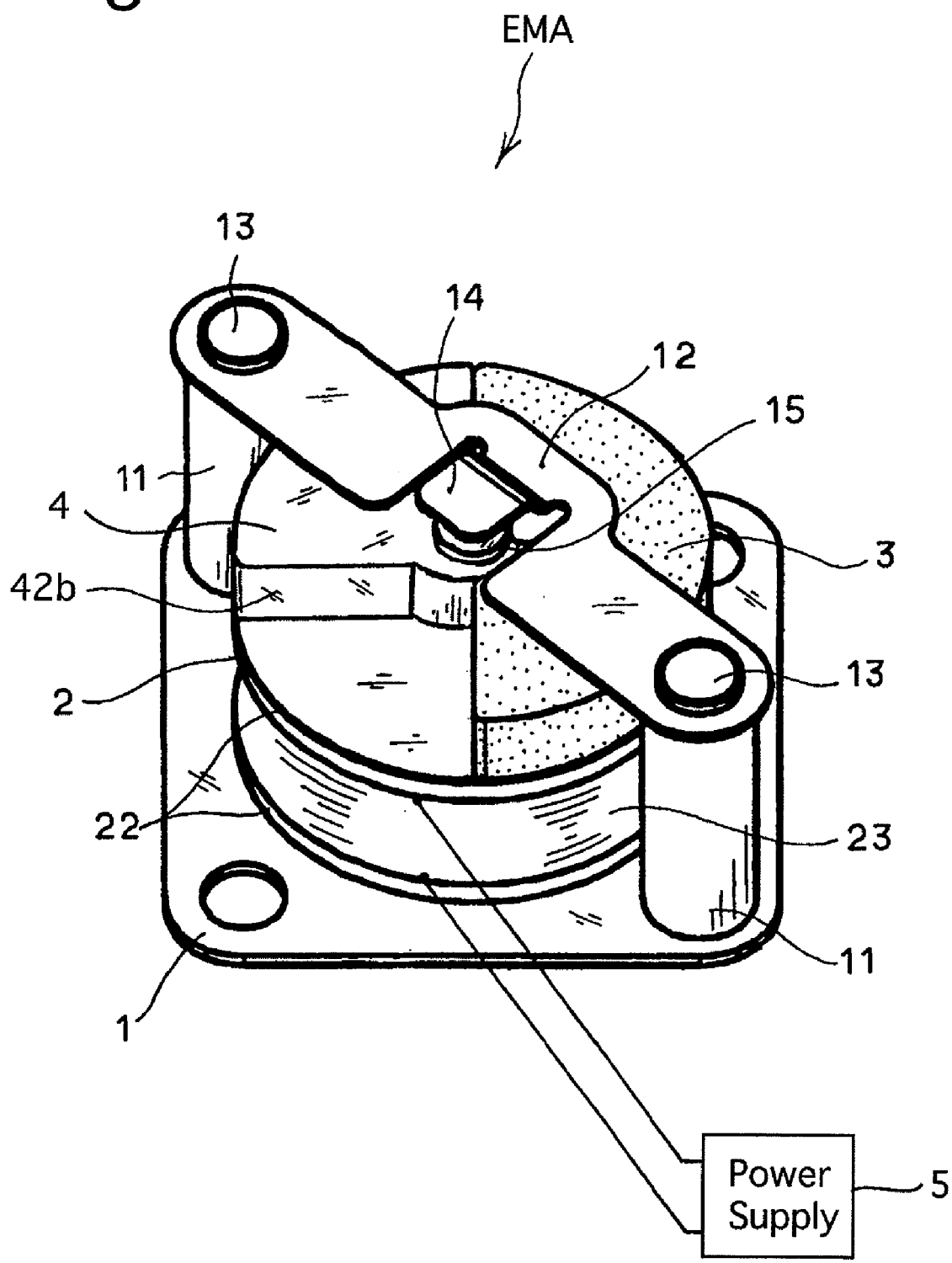
FIG. 1 is an external perspective view of an electromagnetic actuator in Embodiment 1, showing the outward appearance thereof.
Figure 2:
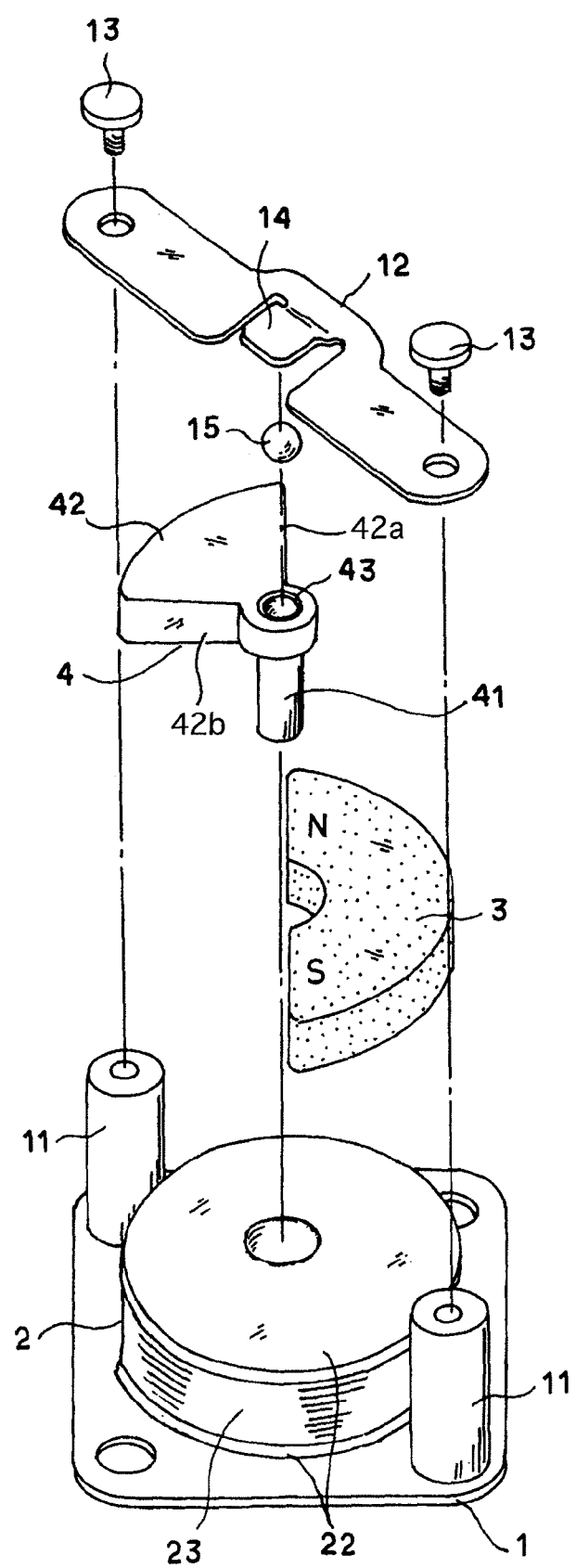
FIG. 2 is an exploded perspective view of a portion of the electromagnetic actuator shown in FIG. 1.
Figure 3A:
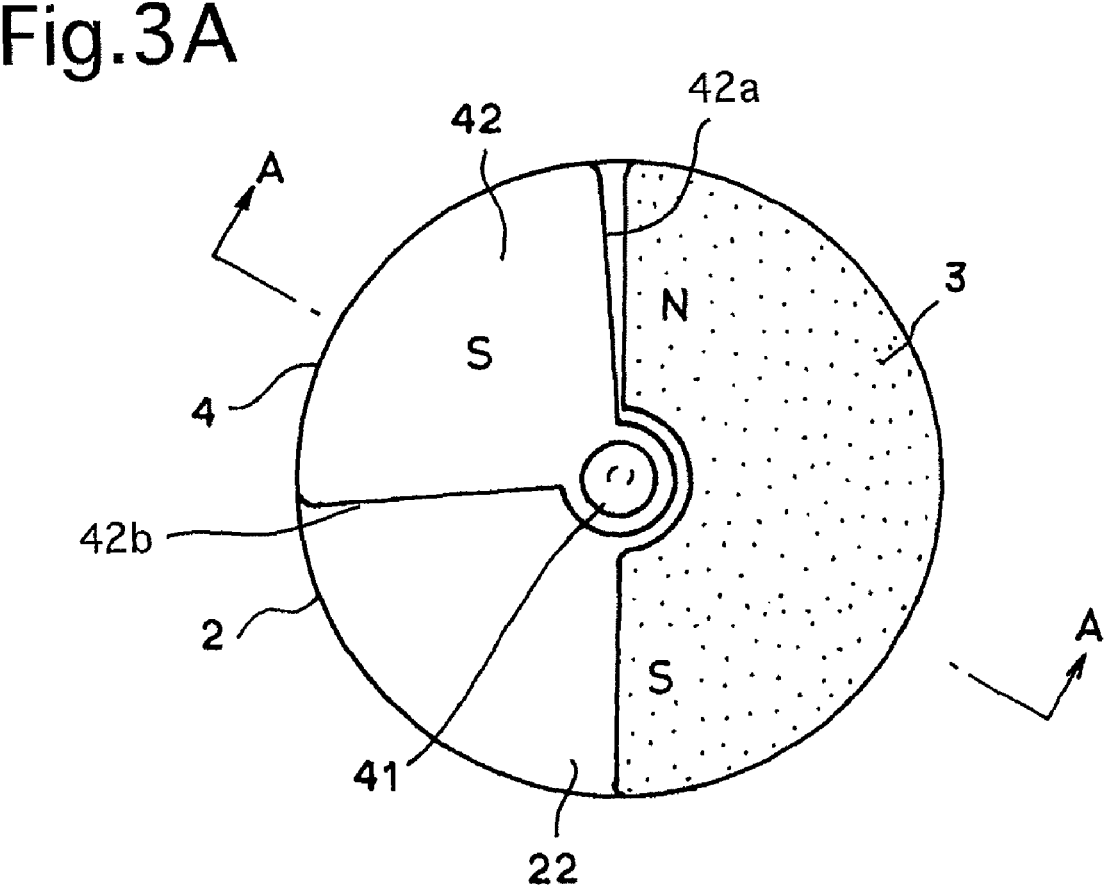
FIG. 3A is a plan view of a main part of the electromagnetic actuator shown in FIG. 1.
Figure 3B:
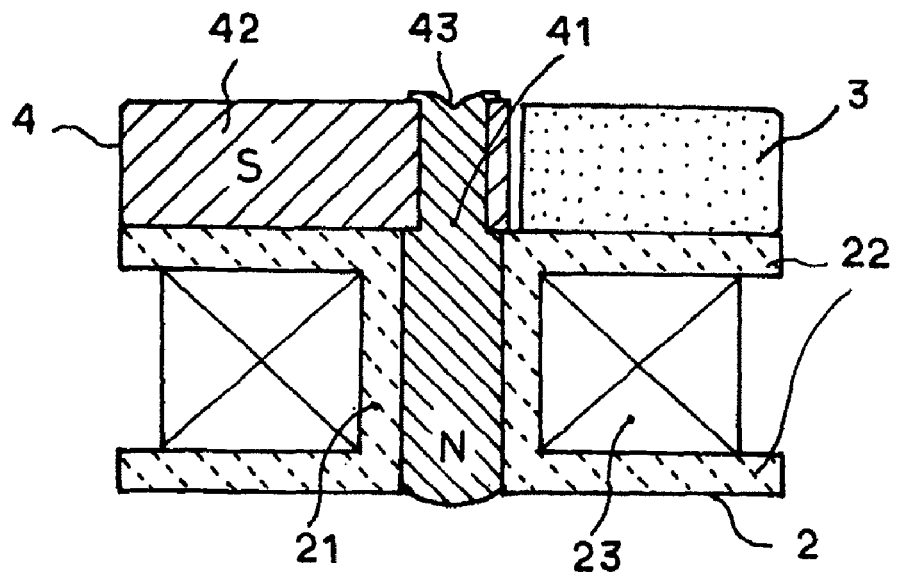
FIG. 3B is a cross sectional view taken along the A-A line shown in FIG. 3A.

FIG. 1 is an external perspective view of an electromagnetic actuator EMA of Embodiment 1, showing the outward appearance thereof, and FIG. 2 is a perspective view of a portion of the electromagnetic actuator EMA. FIG. 3A is a plan view of a main part of the electromagnetic actuator EMA, and FIG. 3B is a cross sectional view taken along the A-A line shown in FIG. 3A. The electromagnetic actuator EMA is provided with a base (seating plate) 1, a cylindrical bobbin 2, a coil 23 and a permanent magnet 3. In these drawings, a cylindrical bobbin 2 made of a non-magnetic material, specifically an insulating material, is fixed onto the base (seating plate) 1 made of a substantially flat rectangular plate. The cylindrical bobbin 2 is provided at a center thereof with a hollow cylindrical portion 21, and is further provided, at the opposite ends of the hollow cylindrical portion 21 in the axial direction thereof, with two disk flanges 22, respectively. Clad wire is wound around the hollow cylindrical portion 21 between the two disk flanges 22 to form the coil 23 therebetween. The cylindrical bobbin 2 is fixed at the lower disk flange 22 thereof to the base 1, and the permanent magnet 3 that is provided as a stationary member is fixedly mounted on top of the upper disk flange 22. The permanent magnet 3 has a required thickness and is formed as a semi-circular (or sector-shaped) plate. The permanent magnet 3 is magnetized so that one and the other of the diametrically opposite end surfaces thereof become an S-pole and an N-pole, respectively. A required current can be passed through the coil 23 via a power supply 5. Specifically, the power supply 5 is configured to be capable of reversing the direction of flow of the current passed through the coil 23.

The electromagnetic actuator EMA is provided with a movable core 4 which is supported by the cylindrical bobbin 2. The movable core 4 consists of a shaft-shaped core 41 and a sector-shaped core 42. The shaft-shaped core 41 is inserted into the hollow cylindrical portion 21 of the cylindrical bobbin 2 to be rotatable on the axis of the shaft-shaped core 41 (coincident with the axis of the hollow cylindrical portion 21) relative to the cylindrical bobbin 21. The sector-shaped core 42 that is provided as a rotating portion is integrally fixed to the upper end of the shaft-shaped core 41 to extend in a radial direction to be capable of rotating in a circumferential direction along the top surface of the upper disk flange 22 when the shaft-shaped core 41 rotates. The sector-shaped core 42 is formed in the shape of a sector, the central angle of which is approximately 90 degrees, i.e., in the shape of a substantially one quarter of a disk. The sector-shaped core 42 is positioned so that radial edge faces 42a and 42b can face corresponding radial edge faces of the N-Pole and the S-Pole of the permanent magnet 3, respectively. The movable core 4, i.e., a combination of the shaft-shaped core 41 and the sector-shaped core 42 is made of soft iron, or the like, which temporarily acts a magnet upon being influenced by a magnetic field. The movable core 4 serves as a movable member in the present embodiment of the electromagnetic actuator according to the present invention.

A pair of columns 11 are fixed to the base 1 to extend upright at positions to hold the cylindrical bobbin 2 from opposite sides thereof, and a retaining leaf spring 12 is fixed at the opposite ends thereof to the pair of columns 11 (specifically, the upper ends thereof with respect to FIG. 2) by two screws 13, respectively, to extend over the pair of columns 11. The retaining leaf spring 12 is provided, at a central portion thereof in the lengthwise direction of the retaining leaf spring 12, with a retaining lug 14. The shaft-shaped core 41 is provided at one end (upper end with respect to FIG. 2) with a round recess 43 into which a ball 15 is partly inserted, and the retaining lug 14 is in press contact with the ball 15 that is partly inserted into the recess 43. This press contact of the retaining lug 14 with the ball 15 causes the other end (lower end with respect to FIG. 2) of the shaft-shaped core 41 to come in press contact with the top surface of the base 1, so that the shaft-shaped core 41 is held in the hollow cylindrical portion 21 to be rotatable on the axis of the shaft-shaped core 41.

Figure 4A:
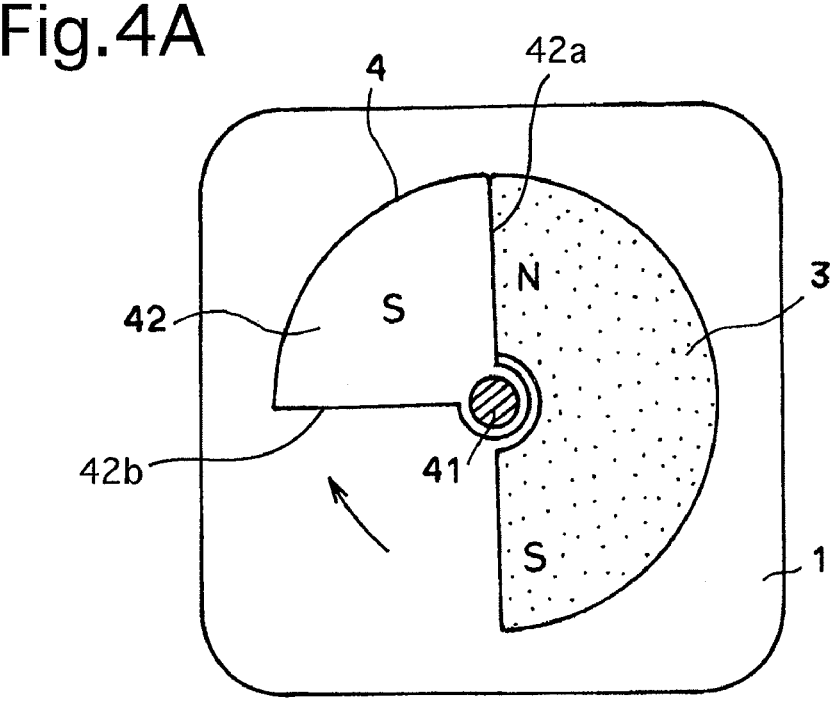
FIGS. 4A and 4B are schematic plan views for illustrating the operation of the electromagnetic actuator.

The electromagnetic actuator EMA that has the above described structure is configured so that the positive-negative polarity of the direct current passed through the coil 23 by current control at the power supply 5 that is connected to the coil 23 as shown in FIG. 1, i.e., the direction of flow of this current can be switched by switching control. Supposing a current is passed through the coil 23 in a first direction, the movable core 4 is magnetized so that the lower end of the shaft-shaped core 41 becomes an N-pole and so that the upper end of the shaft-shaped core 41 becomes an S-pole, and therefore, the sector-shaped core 42 that is connected to the upper end of the shaft-shaped core 41 becomes an S-pole. Due to this magnetization, the sector-shaped core 42 is attracted by the N-pole of the permanent magnet 3, and therefore, the shaft-shaped core 41, i.e., the movable core 4 is rotated in the clockwise direction with respect to FIG. 4A so that the radial-edge face 42a of the sector-shaped core 42 at the front in the clockwise rotation direction is magnetically stuck to the end surface of the permanent magnet 3 on the N-pole side as shown in FIG. 4A. Accordingly, this end surface of the permanent magnet 3 serves as a stopper for stopping rotation of the movable core 4 to hold the movable core 4 at the position where the radial-edge face 42a of the sector-shaped core 42 is in contact with the N-pole-magnetized end of the permanent magnet 3 as shown in FIG. 4A. Namely, the permanent magnet 3 restricts the rotating operation of the movable core 4 and holds the movable core 4 at the rotation position thereof shown in FIG. 4A. Furthermore, the sector-shaped core 42 remains held at the position shown in FIG. 4A by the radial-edge face 42a being magnetically stuck to the N-Pole of the permanent magnet even if current passing through the coil 23 is cut.

Figure 4B:
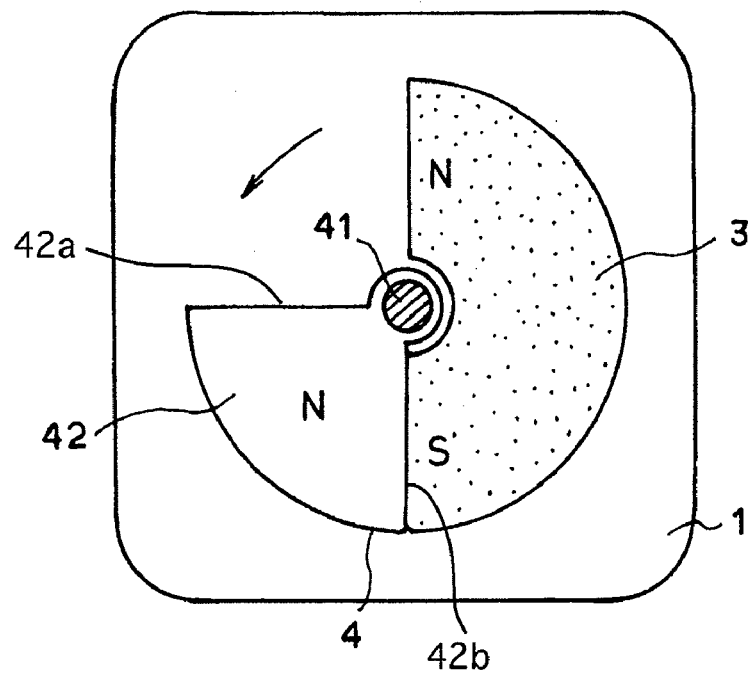

Upon the direction of flow of the current which is passed through the coil 23 being switched from the first direction to the second direction which is opposite to the first direction at the power supply 5, the polarities of the electric field and the magnetic field generated by the coil 23 are reversed and the movable core 4 is magnetized so that the lower end and the upper end of the shaft-shaped core 41 become an S-pole and an N-pole, respectively, and therefore, the sector-shaped core 42 that is connected to the upper end of the shaft-shaped core 41 becomes an N-pole as shown in FIG. 4B. Due to this magnetization, the sector-shaped core 42 repels the N-pole of the permanent magnet 3 and is attracted by the S-pole of the permanent magnet 3 that is positioned on the opposite side of the permanent magnet 3 from the N-pole thereof in a circumferential direction, and therefore, the sector-shaped core 42 rotates through approximately 90 degrees in the counterclockwise direction with respect to FIG. 4A and the movable core 4 is held at the position where the radial-edge face 42b of the sector-shaped core 42 is in contact with the S-pole magnetized end of the permanent magnet 3 as shown in FIG. 4B. Namely, in this case also, the permanent magnet 3 restricts the rotating operation of the movable core 4 and holds the movable core 4 at the rotation position thereof shown in FIG. 4B. Furthermore, the sector-shaped core 42 remains held at the position shown in FIG. 4B by the radial-edge face 42b being magnetically stuck to the N-Pole of the permanent magnet even if current passing through the coil 23 is cut.

From this state, if the direction of flow of the current which is passed through the coil 23 is again switched from the second direction to the first direction at the power supply 5, the energized state of the movable core 4 is reversed, so that the sector-shaped core 42 is magnetized toward the N-pole, and accordingly, the sector-shaped core 42 repels the S-pole of the permanent magnet 3 and is attracted by the N-pole of the permanent magnet 3. Consequently, the sector-shaped core 42 rotates in the clockwise direction and the movable core 4 is held at the position where the sector-shaped core 42 is in contact with the N-pole magnetized end of the permanent magnet 3 as shown in FIG. 4A. In this manner, the sector-shaped core 42 and the shaft-shaped core 41, i.e., the movable core 4 can be rotated reciprocatively within the range of 90 degrees that corresponds to the central angle of the permanent magnet 3 relative to the cylindrical bobbin 2, which makes it possible to achieve an electromagnetic actuator in which the movable core 4 rotates reciprocatively. Furthermore, in this electromagnetic actuator, the cylindrical bobbin 2 that includes the coil 23 is stationary, the permanent magnet 3 is also stationary, and only the movable core 4, i.e., a combination of the sector-shaped core 42 and the shaft-shaped core 41, which is made of a temporary (soft) magnetic material that is magnetized with the application of an electric field and a magnetic field, rotates reciprocatively. The movable core 4 can be made of soft iron or the like, and therefore, the weight of the electromagnetic actuator EMA can be reduced by a greater degree than the case where the movable core 4 is made of a magnet or the like. Consequently, the inertial force of the movable core 4 when it rotates reciprocatively can be reduced, and the movable core 4 can rotate at a fast rotational speed. In addition, since the movable core 4 is magnetized by a magnetic force of the permanent magnet 3 when the sector-shaped core 42 is magnetically attracted by the permanent magnet 3 and attached thereto, the state where the movable core 4 is magnetically attracted by the permanent magnet 3 and attached thereto can be maintained, namely, a self-holding state is possible. In this manner, the permanent magnet 3 that serves as a stationary member functions as a stopper for determining the range of rotation of the movable core 4 and can hold the movable core 4 having rotated to hold the rotation position thereof. Therefore, the number of elements of the electromagnetic actuator EMA can be reduced and the structure thereof can be simplified since the stationary member can be composed of a single permanent magnet instead of a plurality of permanent magnets and a rotary plate stopper such as disclosed in Patent Document 1. Consequently, miniaturization and weight reduction of the electromagnetic actuator EMA become possible.

Here, supposing that the central angle of the sector-shaped core 42, the central angle of the permanent magnet 3 and the maximum angle of rotation of the movable core 4 are $\theta a$, $\theta b$ and $\theta r$, respectively, the following equation is satisfied:

$$\theta a + \theta b + \theta r = 2\pi (360°).$$

Therefore, an electromagnetic actuator is achieved in which a movable member rotates reciprocatively at any given angle of rotation by appropriately determining the central angles $\theta a$ and $\theta b$ in consideration of the magnitude of the magnetic force generated between the permanent magnet 3 and the sector-shaped core 42, i.e., the repulsive force and the attractive force which are generated between the permanent magnet 3 and the sector-shaped core 42. The sector-shaped core 42 that concerns the present invention does not necessarily have the shape of a sector; the sector-shaped core 42 can be replaced by a rod-shaped core if it has a shape which projects radially from a part of the shaft-shaped core 41. Additionally, the permanent magnet 3 does not necessarily have the shape of a semicircle; so long as the electromagnetic actuator is structured so that at least one of the surfaces of the permanent magnet 3 which face the sector-shaped core 42 is magnetized into an N-pole or an S-pole when the sector-shaped core 42 rotates, the permanent magnet 3 can magnetically attract and repel the sector-shaped core via this magnetized pole, and accordingly, the present invention can be applied to such an electromagnetic actuator.

Embodiment 2

Figure 5:
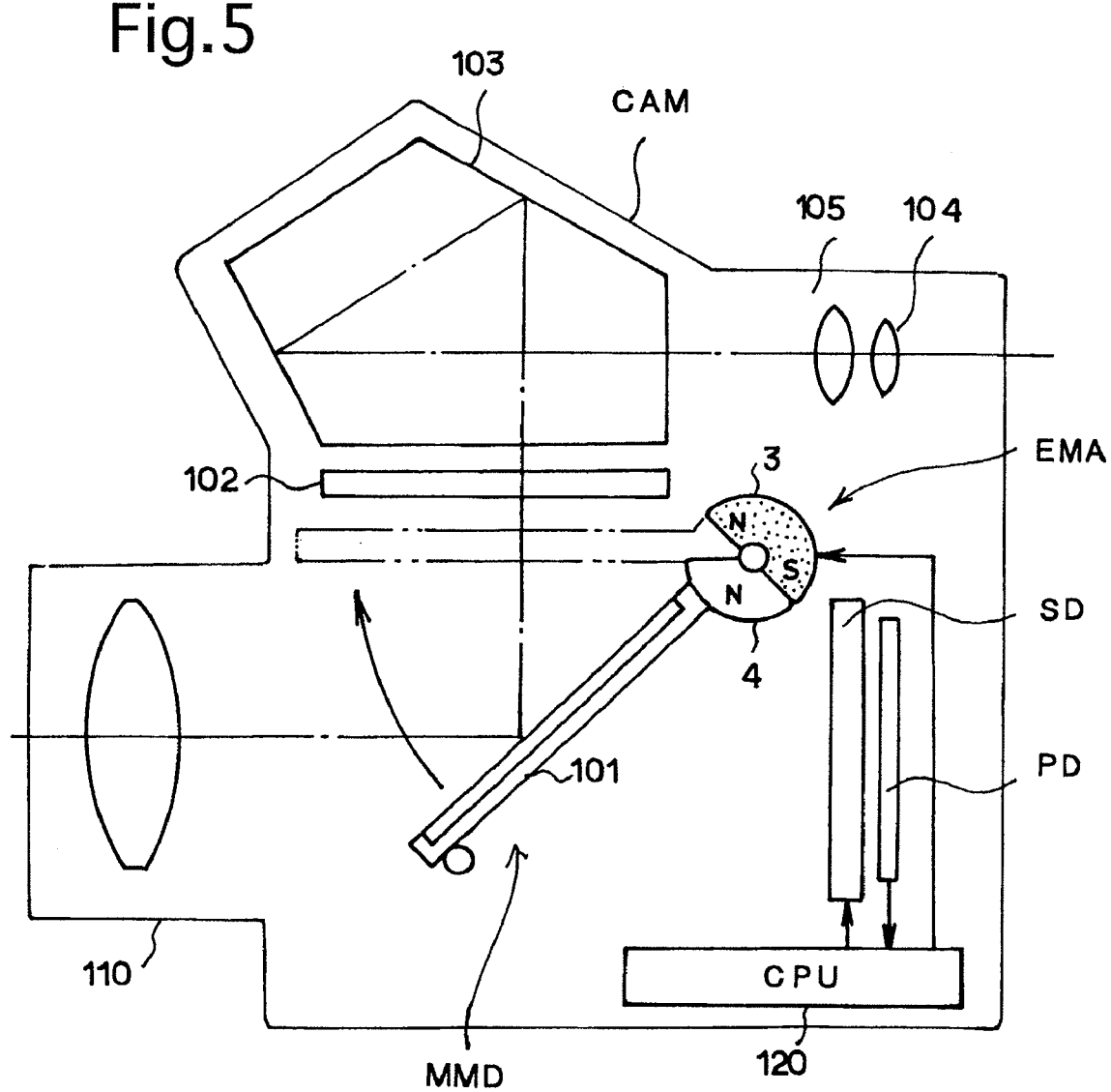
FIG. 5 is a schematic diagram of an SLR camera of Embodiment 2 that includes a mirror drive device to which the electromagnetic actuator according to the present invention is applied.

FIG. 5 is a schematic diagram of an SLR camera CAM in Embodiment 2 that includes a mirror drive device MMD to which the electromagnetic actuator EMA according to the present invention is applied, showing the internal structure of the SLR camera CAM. The camera body 100 of the SLR camera CAM is structured so that a photographing lens 110 can be attached to the front of the camera body 100 and so that object light to be formed as an object image via the photographing lens 110 is reflected upward by a main mirror (quick-return mirror) 101 installed inside the camera body 100 to be formed as an object image onto a focusing screen 102 made of a transparent material such as glass or a plastics. The object image formed on the focusing plate 102 can be viewed by the user of the SLR camera CAM through a finder optical system 105 which includes an eyepiece lens 104, a pentagonal prism 103. At a time of exposure by a depression of a release button (not shown), the main mirror 101 is rotated upward while a shutter device SD installed behind the main mirror 101 opens, and thereupon, the object light to be formed as an object image via the photographing lens 110 is formed on an electronic imaging device PD behind the shutter device SD to be captured as image data. Similar operations are carried out in a camera using silver-salt film instead of the electronic imaging device PD.

Figure 6:
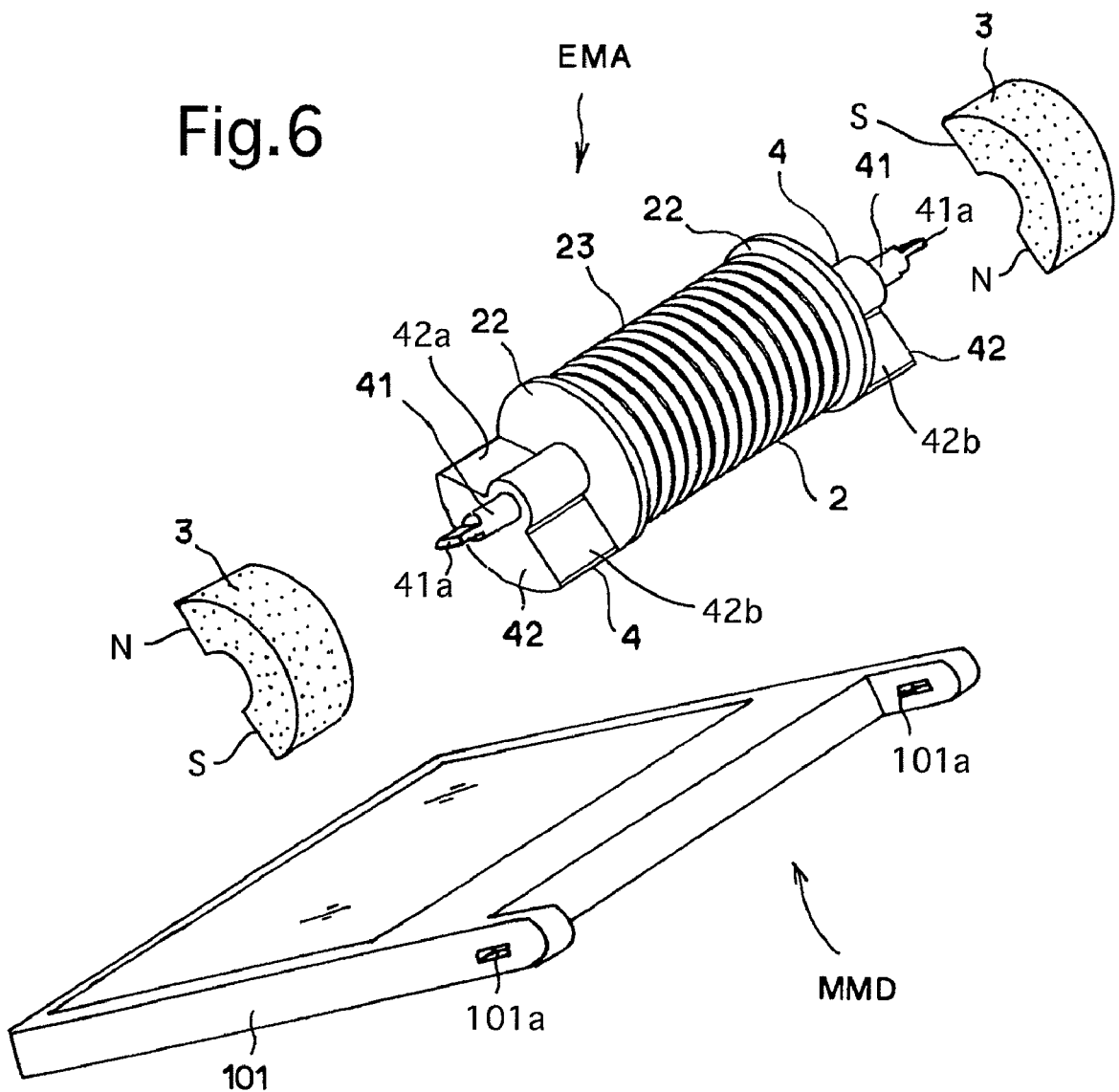
FIG. 6 is an exploded perspective view of a portion of the mirror drive device shown in FIG. 5.
Figure 7A:
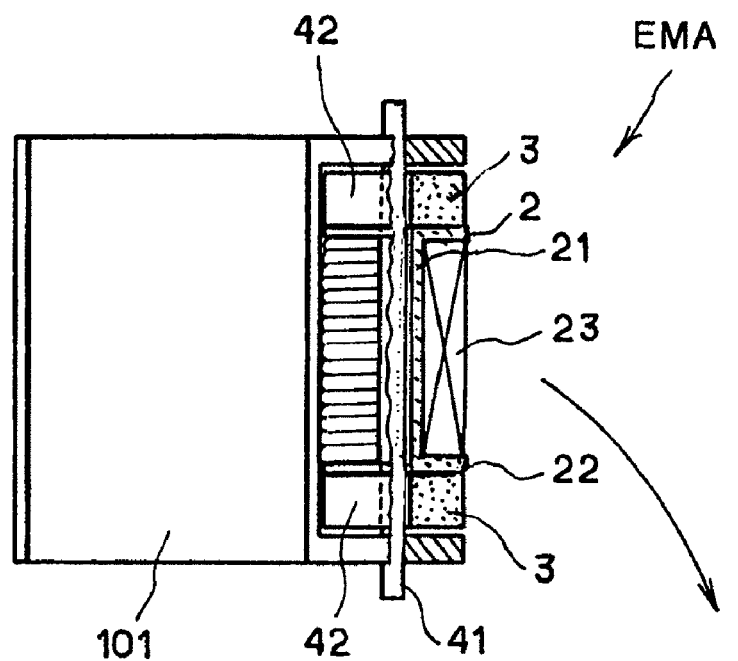
FIG. 7A is a partly cutaway plan view of a portion of the mirror drive device shown in FIG. 6.
Figure 7B:
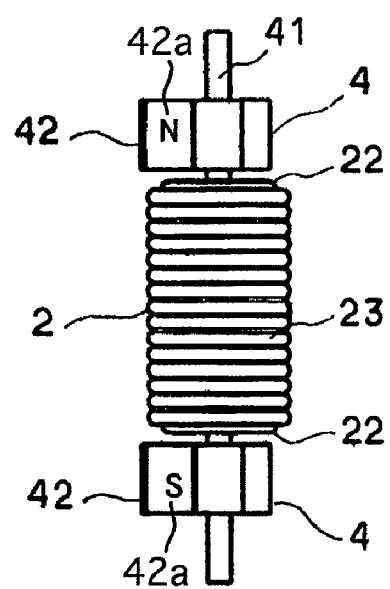
FIG. 7B is a plan view of the electromagnetic actuator shown in FIG. 7A.

FIG. 6 is an exploded perspective view of a portion of the mirror drive system shown in FIG. 5 which includes the main mirror 101 and the electromagnetic actuator EMA for rotating the main mirror 101. FIG. 7A is a partly cutaway plan view of a portion of the mirror drive system shown in FIG. 6, and FIG. 7B is a plan view of the electromagnetic actuator EMA shown in FIG. 7A. Portions and elements of the electromagnetic actuator EMA in Embodiment 2 which are equivalent to those of the electromagnetic actuator EMA in Embodiment 1 are designated by the same reference numerals. The electromagnetic actuator EMA in Embodiment 2 is structured so that the cylindrical bobbin 2 is smaller in radius than the cylindrical bobbin 2 of Embodiment 1 and the cylindrical bobbin 2 is greater in axial length than the cylindrical bobbin 2 in Embodiment 1, so that a desired electric field and a desired magnetic field are generated when a current is applied to the coil 23. The cylindrical bobbin 2 is fixed to the camera body 100 by a fixing device (not shown) to be supported by the camera body 100, and two permanent magnets 3, each of which has the shape of a semi-circular plate just like the permanent magnet 3 of Embodiment 1, are fixed to the disk flanges 22 at both ends of the cylindrical bobbin 2, respectively. However, the two permanent magnets 3 on both sides of the cylindrical bobbin 2 are configured so that the positions of the S-pole and the N-pole of one of the two permanent magnets 3 thereof are reverse with respect to the positions of the S-pole and the N-pole of the other permanent magnet 3 in a circumferential direction. The coil 23 is electrically connected to a CPU 120 installed in the camera body 100. The CPU 120 controls the direction of flow of the current supplied to the coil 23 when the main mirror 101 is driven.

As shown in FIG. 7A, the shaft-shaped core 41 extends through the hollow cylindrical portion 21 of the bobbin 2 to be allowed to rotate on the axis of the shaft-shaped core 41, and two sector-shaped cores 42 are joined to both ends of the shaft-shaped core 41 to face the two permanent magnets 3 in a circumferential direction, respectively. Unlike the sector-shaped core 42 in Embodiment 1, each of the two sector-shaped cores 42 in Embodiment 2 is shaped so that the central angle thereof is approximately 135 degrees. The shaft-shaped core 41 and each sector-shaped core 42 are made of magnetic material, similar to those in Embodiment 1. Additionally, the shaft-shaped core 41 is provided at both ends thereof with two key portions 41a, respectively. The two keys portions 41a are respectively fitted into two key slots 101a formed through a base portion of the main mirror 101 so that the main mirror 101 of the SLR camera CAM rotates integrally with the shaft-shaped core 41.

In Embodiment 2, since the two permanent magnets 3 on both sides of the cylindrical bobbin 2 have opposite polarities, the driving of the mirror-up/down operations can be controlled by supplying current in one direction to the one coil 23 via control from the CPU 120. Moreover, since the main mirror 101 is driven at both ends of the rotational shaft of the main mirror 101, an improvement in the movement precision of the main mirror 101 is achieved with respect to lateral tilting and/or distortion thereof. Due to the current being supplied to the coil 23, one and the other of the two sector-shaped cores 42 that are installed on both sides of the cylindrical bobbin 2 are magnetized as an S-pole and an N-pole, respectively, by an electric field and a magnetic field generated by the coil 23. The sector-shaped core 42 on the left-hand side in FIG. 6 is shown in FIG. 5. The sector-shaped core 42 on this side is magnetized as an N-pole and thus attracted and held by the S-pole of the associated permanent magnet 3 as shown in FIG. 5. The sector-shaped core 42 on the right-hand side in FIG. 6 is magnetized as an S-pole and thus attracted and held by the N-pole of the associated permanent magnet 3. With this configuration, as shown in FIG. 5, the main mirror 101 is in a downwardly-rotated position, i.e., in a mirror-down state in which the main mirror 101 has been rotated counterclockwise with respect to FIG. 5. In this state, the rotation position of the main mirror 101 is fixed by the contacting of each sector-shaped core 42 with one of the two end surfaces of the associated permanent magnet 3. In this state, object light to be formed as an object image via the photographing lens 110 is reflected upward by the main mirror 101 and formed as an object image onto the focusing screen 102, so that the object image on the focusing screen 102 can be viewed through the finder optical system 105.

Upon the release button (not shown) of the SLR camera CAM being depressed, the CPU 120 changes the direction of flow of the current passed through the coil 23. This change reverses the polarity of each sector-shaped core 42. The polarity of the sector-shaped core 42 on the left-hand side in FIG. 5 is reversed to an S-pole, so that this sector-shaped core 42 repels the S-pole of the associated permanent magnet 3, thus being rotated clockwise with respect to FIG. 5 to be attracted by the N-pole of the associated permanent magnet 3. Upon rotating by approximately 45 degrees, the sector-shaped core 42 on the left-hand side shown in FIG. 5 comes into a state where the sector-shaped core 42 is attracted by the associated permanent magnet 3 and attached thereto while the main mirror 101 rotates clockwise to the raised position (retracted position) shown by a two-dot chain line in FIG. 5; namely, a mirror-up operation is performed. In this state, the rotational position of the main mirror 101 is fixed by the contacting of each sector-shaped core 42 with the other of the two end surfaces of the associated permanent magnet 3. Upon completion of this mirror-up operation, object light to be formed as an object image via the photographing lens 120 passes through the shutter device SD and is formed on the electronic imaging device PD to be captured as image data.

Upon capturing image data, the CPU 120 again changes the direction of flow of the current passed through the coil 23 to return the polarity of each sector-shaped core 42 back to the initial polarity. This causes each sector-shaped core 42 to repel the magnetic pole of the associated permanent magnet 3 which previously attracts and holds the sector-shaped core 42, thus causing each sector-shaped core 42 to rotate counterclockwise with respect to FIG. 5 to be attracted by the other magnetic pole of the associated permanent magnet 3; consequently, the main mirror 101 is returned to the mirror-down state. The two sector-shaped cores 42 are configured so that the stoppers on both sides (i.e., the permanent magnets 3) are equivalent in position to each other so that the two sector-shaped cores 42 come into contact simultaneously with the associated two permanent magnets 3 that face the two sector-shaped cores 42, respectively, when the two sector-shaped cores 42 rotate, to thereby set the rotation position of the main mirror 101.

As can be understood from the above description of Embodiment 2, due to the structure in which the radial edge faces 42a and 42b of the two sector-shaped cores 42 abut against the edge surfaces (S-pole and N-pole) of the two permanent magnets 3 so as to be attracted and held there at when the main mirror 101 being driven, vibration when the main mirror 101 is stopped upon being driven in up/down directions can be suppressed.

In Embodiment 2, the electromagnetic actuator EMA is used as a drive source of the mirror drive device MMD that rotates the main mirror 101 upward and downward, the electromagnetic actuator EMA requires only two permanent magnets whereas the electromagnetic actuator of the prior art (Document 1) requires at least four permanent magnets and two rotary plate stoppers, and the electromagnetic actuator EMA of Embodiment 2 does not require any rotary plate stopper. Accordingly, a reduction in the number of elements of the electromagnetic actuator EMA can be achieved and a fast and quick returning operation of the main mirror 101 can be achieved. Furthermore, miniaturization and weight reduction of the mirror drive device MMD can be achieved, thus making miniaturization and weight reduction of the SLR camera CAM possible.

Embodiment 3

Figure 8A:
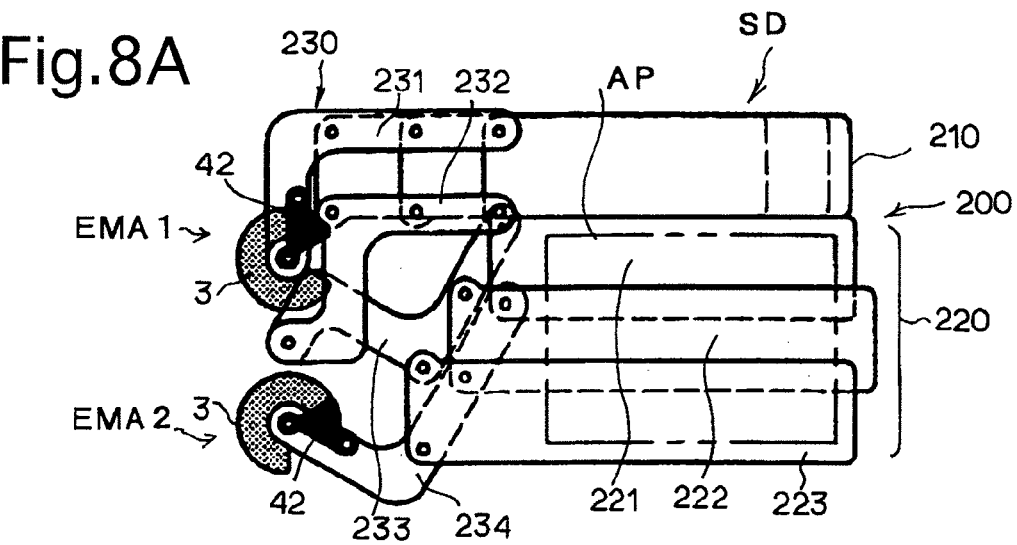
FIGS. 8A, 8B and 8C are front elevational views showing different states of a shutter device in Embodiment 3 to which the electromagnetic actuator according to the present invention is applied.
Figure 8B:
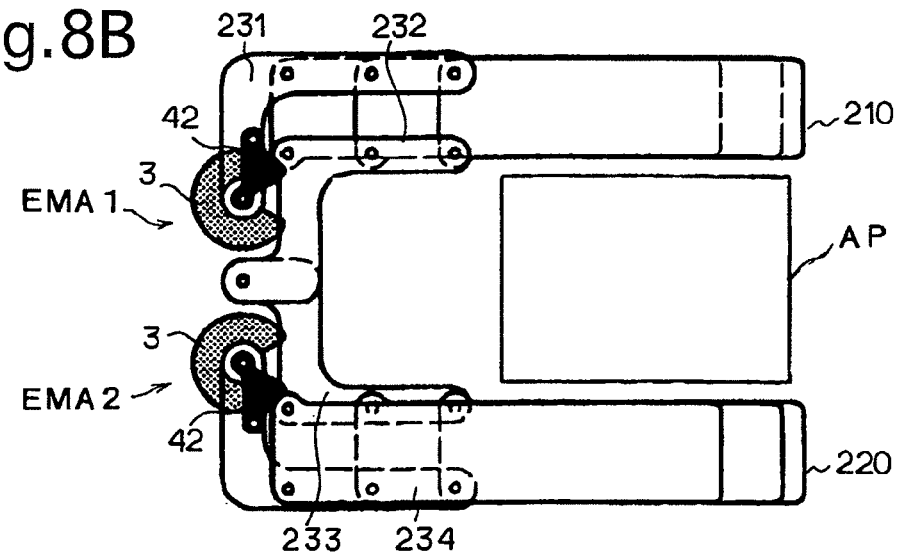
Figure 8C:
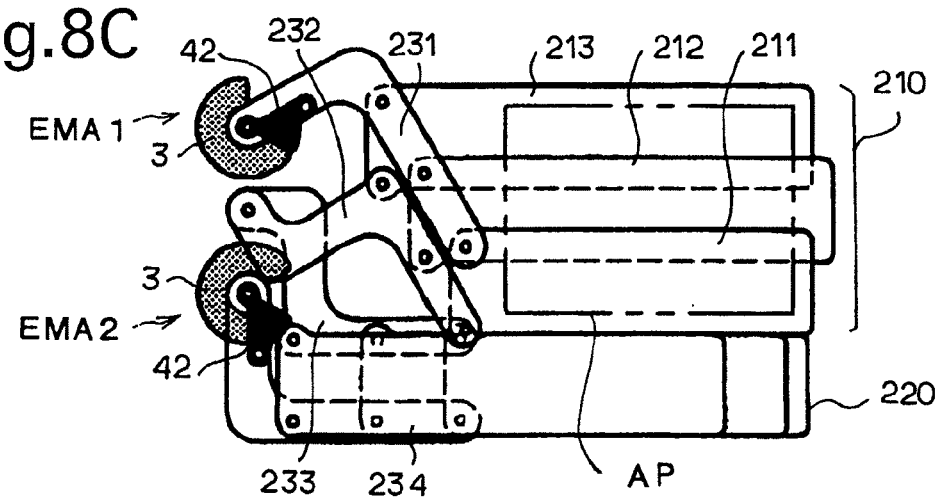

FIGS. 8A, 8B and 8C show the shutter device SD of the SLR camera CAM in Embodiment 3 to which two electromagnetic actuators according to the present invention are applied, showing the structure of a vertically-traveling focal plane shutter. The shutter device SD is composed of focal-plane shutter blades 200 and a shutter blade drive mechanism 230. The focal-plane shutter blades 200 that are driven to open and shut a rectangular photographing aperture AP are positioned in front of the electronic imaging device PD of the SLR camera CAM as shown in FIG. 5 or in front of silver-salt film. The shutter blade drive mechanism 230 drives the focal-plane shutter blades 200. The focal-plane shutter blades 200 are provided with an upper set of shutter blades 210 and a lower set of shutter blades 220. The upper set of shutter blades 210 includes a first shutter blade 211, a second shutter blade 212 and a third shutter blade 213, and the lower set of shutter blades 220 includes a first shutter blade 221, a second shutter blade 222 and a third shutter blade 223. In addition, the shutter blade drive mechanism 230 is provided with an upper pair of linkages 231 and 232 and a lower pair of linkages 233 and 234 which are linked with the upper set of shutter blades 210 and the lower set of shutter blades 220, respectively. The upper pair of linkages 231 and 232 are rotated reciprocatively by a first electromagnetic actuator EMA1 and the lower pair of linkages 233 and 234 are rotated reciprocatively by a second electromagnetic actuator EMA2. These reciprocative rotations cause the upper set of shutter blades 210 and the lower set of shutter blades 220 to move in vertical directions so as to open and shut the photographing aperture AP.

Namely, in the state shown in FIG. 8A, the first electromagnetic actuator EMA1 has rotated the upper pair of linkages 231 and 232 upwardly to retract the upper set of shutter blades 210 above the photographing aperture AP, whereas the second electromagnetic actuator EMA2 has rotated the lower pair of linkages 233 and 234 upwardly to bring the lower set of shutter blades 220 to the immediate front of the photographing aperture AP to shut the photographing aperture AP. In this state shown in FIG. 8A, if the second electromagnetic actuator EMA2 rotates clockwise to rotate the lower pair of linkages 233 and 234 downwardly as shown in FIG. 8B, the lower set of shutter blades 220 is retracted below the photographing aperture AP to open the photographing aperture AP. Subsequently, if the first electromagnetic actuator EMA1 rotates clockwise as shown in FIG. 8C, the upper pair of linkages 231 and 232 are rotated downwardly, which causes the upper set of shutter blades 210 which are previously retracted above the photographing aperture AP to move to the immediate front of the photographing aperture AP to shut the photographing aperture AP. By performing this series of operations, the photographing aperture AP opens and shuts to perform a shutter operation. In the subsequent shutter operation, each of the first electromagnetic actuator EMA1 and the second electromagnetic actuator EMA2 sequentially performs the above described operations thereof in reverse order to make the upper set of shutter blades 210 and the lower set of shutter blades 220 operate in the order from FIG. 8C to FIG. 8A to open and shut the photographing aperture AP so that a similar shutter operation is performed.

In Embodiment 3, the first electromagnetic actuator EMA1 and the second electromagnetic actuator EMA2 are the same type of electromagnetic actuators. The first electromagnetic actuator EMA1 and the second electromagnetic actuator EMA2 will not be hereinafter discussed in detail in the following description because each of the first electromagnetic actuator EMA1 and the second electromagnetic actuator EMA2 is identical in structure to the electromagnetic actuator EMA of Embodiment 1. In order to perform the above described shutter operation, in each of the first electromagnetic actuator EMA1 and the second electromagnetic actuator EMA2, the maximum rotational angle of each sector-shaped core 42 is limited to 60 degrees, and each permanent magnet 3 is formed so that the central angle thereof is 240 degrees and each sector-shaped core 42 is formed so that the central angle thereof is 60 degrees to define the stop position of the movable core 4.

In Embodiment 3, since the first electromagnetic actuator EMA1 and the second electromagnetic actuator EMA2 according to the present invention are used as two drive sources which serve as elements of a shutter drive mechanism which upwardly/downwardly rotates the linkages for vertically driving the focal-plane shutter blades of the shutter device SD, and since a reduction in the number of elements, miniaturization and weight reduction are possible in each of the first electromagnetic actuator EMA1 and the second electromagnetic actuator EMA2 according to the present invention by a greater degree than the electromagnetic actuator disclosed in Patent Publication 1, miniaturization and weight reduction of the shutter device are possible, which makes miniaturization and weight reduction of the SLR camera CAM possible. Additionally, since the shutter opening operation becomes a reciprocating operation, no shutter charging operation is required, which allows the first electromagnetic actuator EMA1 and the second electromagnetic actuator EMA2 to be utilized for use in consecutive shooting.

The electromagnetic actuator according to the present invention is not limited to the particular type of electromagnetic actuator for driving a main mirror of an SLR camera in Embodiment 2 or the particular type of electromagnetic actuator for driving a focal plane shutter in Embodiment 3, but can also be applied to a drive source of a drive mechanism required to rotate a movable member reciprocatively. The electromagnetic actuator according to the present invention is most suitable especially for use as a drive source of a mechanism which is to be miniaturized and reduced in weight.

As can be understood from Embodiments 1 through 3, according to the present invention, it is possible to provide an electromagnetic actuator which rotates reciprocatively at any given rotation angle by appropriately changing the central angles of the movable core and the permanent magnet. Moreover, the stationary member that serves as an element of the electromagnetic actuator according to the present invention, i.e., each permanent magnet in Embodiments 1 through 3, can be simply formed to have two surfaces of an S-pole and an N-pole which are circumferentially opposed to two surfaces of a movable member, respectively. The present invention can also be applied to the case where each permanent magnet can be formed to have only one surface of an S-pole or an N-pole which is opposed to a surface of a movable member. Accordingly, the present invention is not limited solely to the particular structures of Embodiments 1 through 3.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An electromagnetic actuator comprising:
    a bobbin made of a non-magnetic material which includes a hollow cylindrical portion and two disk flanges fixed to opposite ends of said hollow cylindrical portion, respectively;
    a coil formed between said two disk flanges by winding insulated wire around said hollow cylindrical portion;
    a power supply which supplies a current to said coil;
    a movable member pivoted on said hollow cylindrical portion; and
    at least one stationary member made of a permanent magnet and fixed to at least one of said two disk flanges,
    wherein said movable member is made of a magnetic material and comprises a shaft portion and at least one rotating portion, wherein said shaft portion is pivoted about said hollow cylindrical portion, wherein said rotating portion is fixed to said shaft portion, lies on said disk flange, and extends in a radial direction of said shaft portion, wherein, when said power supply supplies said current to said coil in a predetermined direction, said rotating portion is magnetized to a predetermined polarity and rotates on said disk flange by a magnetic force of said permanent magnet, and wherein said stationary member includes a stopper for stopping rotation of said movable member at a predetermined rotational position.

2. The electromagnetic actuator according to claim 1, wherein said rotating portion of said movable member is formed into a sector-shaped core centered about an axis of said shaft portion, wherein said stationary member is provided so as to lie in a plane in which said sector-shaped core of said movable member rotates, and wherein radial-edge faces of said stationary member are magnetized as one and the other of an S-pole and an N-pole.

3. The electromagnetic actuator according to claim 2, wherein two of said rotating portions are joined to both ends of said shaft portion, respectively, and are magnetized as opposite polarities, respectively, when said power supply supplies said current to said coil, wherein two of stationary members are positioned to correspond to said two sector-shaped portions, and wherein radial-edge faces of each of said two stationary members are magnetized as one and the other of an S-pole and an N-pole.

4. The electromagnetic actuator according to claim 3, wherein said electromagnetic actuator is used as a drive source of a mirror drive device for rotating a main mirror of an SLR camera reciprocatively.

5. The electromagnetic actuator according to claim 2, wherein the following equation is satisfied:

$$\theta a + \theta b + \theta r = 2\pi,$$

wherein θa designates a central angle of said sector-shaped core,

θb designates a central angle of said stationary member, and

θr designates a maximum angle of rotation of said sector-shaped core.

6. The electromagnetic actuator according to claim 1, wherein said electromagnetic actuator is used as a drive source of a mirror drive device for rotating a main mirror of an SLR camera reciprocatively.

7. The electromagnetic actuator according to claim 6, wherein said rotating portion is provided on each lateral end of said main mirror at a rotational axis thereof, wherein each of said rotating portion is formed into a sector-shaped core centered about an axis of said shaft portion, coaxial with said rotational axis of said main mirror, wherein said stationary member is provided at each of said sector-shaped core so as to lie in a plane in which said sector-shaped core of said movable member rotates, wherein radial-edge faces of said stationary member are magnetized as one and the other of an S-pole and an N-pole, and wherein upon said mirror being driven in an up/down direction, one of two radial edge faces of each of said sector-shaped core abut against one of said radial-edge faces of each corresponding said stationary member.

8. The electromagnetic actuator according to claim 1, wherein said electromagnetic actuator is used as a drive source of a shutter device for making shutter blades perform an opening/shutting operation.

9. The electromagnetic actuator according to claim 1, wherein said stationary member is formed as a semi-circular plate.

10. The electromagnetic actuator according to claim 9, wherein said semi-circular plate is substantially identical in radius to said one of said two disk flanges.

11. An electromagnetic actuator comprising:
a bobbin made of a non-magnetic material which includes a hollow cylindrical portion and two disk flanges fixed to opposite ends of said hollow cylindrical portion, respectively;
a coil wound around said hollow cylindrical portion;
a rotatable member which is supported by said bobbin to be freely rotatable about an axis of said hollow cylindrical portion; and
a permanent magnet fixed to one of said two disk flanges,
wherein said rotatable member is made of a soft magnetic material and includes a shaft portion and a swingable portion,
wherein said shaft portion is fitted into said hollow cylindrical portion to be freely rotatable about said axis,
wherein said swingable portion lies on said one disk flange and extends in a radial direction of said shaft portion,
wherein, when current is supplied to said coil in a predetermined direction, said swingable portion is magnetized as a predetermined polarity and rotates on said disk flange by a magnetic force of said permanent magnet, and
wherein at least one of radial-edge faces of said permanent magnet serves as a stopper for stopping rotation of said rotatable member at a predetermined rotation position, said radial-edge faces constituting one and the other of an N-Pole and an S-Pole.

12. An SLR camera, to which a photographing lens is detachably attached, comprising:
a quick-return mirror provided in a camera body of said camera; and
at least one electromagnetic actuator provided on said quick-return mirror and configured to reciprocatively rotate said quick-return mirror between an upward position and a downward position;
said electromagnetic actuator comprising:
a bobbin made of a non-magnetic material which includes a hollow cylindrical portion and two disk flanges fixed to opposite ends of said hollow cylindrical portion, respectively;
a coil formed between said two disk flanges by winding insulated wire around said hollow cylindrical portion;
a power supply which supplies a current to said coil.,
a movable member pivoted on said hollow cylindrical portion; and
at least one stationary member made of a permanent magnet and fixed to at least one of said two disk flanges,
wherein said movable member is made of a magnetic material and includes a shaft portion which is connected with said quick return mirror so as to integrally rotate with said quick-return mirror, and at least one rotating portion,
wherein said shaft portion is pivoted about said hollow cylindrical portion, wherein said rotating portion is fixed to said shaft portion, lies on said disk flange, and extends in a radial direction of said shaft portion, wherein, when said power supply supplies said current to said coil in a predetermined direction, said rotating portion is magnetized to a predetermined polarity and rotates on said disk flange by a magnetic force of said permanent magnet, to thereby rotate said quick-return mirror via said shaft portion, and wherein said stationary member includes a stopper for stopping rotation of said movable member at a predetermined rotational position.

* * * * *